United States Patent [19]

Miyata et al.

[11] Patent Number: 4,692,881
[45] Date of Patent: Sep. 8, 1987

[54] DEVICE FOR DISCRIMINATING ATTITUDE OF PARTS

[75] Inventors: Tsutomu Miyata; Masahide Nagai, both of Tokyo, Japan

[73] Assignee: Kabushiki Kaisha Daini Seikosha, Tokyo, Japan

[21] Appl. No.: 917,244

[22] Filed: Oct. 7, 1986

Related U.S. Application Data

[63] Continuation of Ser. No. 505,777, Jun. 20, 1983, abandoned.

[30] Foreign Application Priority Data

Dec. 18, 1981 [JP] Japan ............................. 56-204795

[51] Int. Cl.[4] ............................................ G06F 15/46
[52] U.S. Cl. .................................. 364/551; 364/507; 364/552; 356/393; 250/572
[58] Field of Search ............... 364/506, 507, 551, 552; 356/375, 376, 393; 250/223 B, 224, 562, 564, 572

[56] References Cited

U.S. PATENT DOCUMENTS

| 3,529,169 | 9/1970 | Heaney et al. | 250/223 |
| 3,737,856 | 6/1973 | Lehrer et al. | 356/393 |
| 3,781,531 | 12/1973 | Baker | 364/507 |
| 4,274,748 | 6/1981 | Burtin et al. | 356/431 |
| 4,343,998 | 8/1982 | Mori | 250/563 |
| 4,408,295 | 10/1983 | Kavage et al. | 364/552 |
| 4,433,385 | 2/1984 | DeGasperi et al. | 364/552 |
| 4,496,056 | 1/1985 | Schoenig, Jr. et al. | 364/507 |

Primary Examiner—Gary Chin
Attorney, Agent, or Firm—Bruce L. Adams; Van C. Wilks

[57] ABSTRACT

Parts in a desired attitude are selected, by memorizing the standard shape signal of a certain part and comparing the shape signals of supplied parts on the parts feeder with the memorized shape signal. A plurality of light emitting elements provided on the track of the parts feeder detect the shape signal of the parts serially.

14 Claims, 11 Drawing Figures

DEVICE FOR DISCRIMINATING ATTITUDE OF PARTS

This is a Rule 62 continuation application of application Ser. No. 505,777 filed June 20, 1983 now abanoment.

BACKGROUND OF THE INVENTION

This invention relates to a device for discriminating the attitude of parts according to certain shape information of the parts.

A conventional method for discriminating the attitude of parts comprises the steps of: examining all the attitudes and shapes of the parts in the course of conveying; positioning detection elements or signal transmission members at a typical portion of each attitude; and discriminating the attitude of the parts. In a rectangular part W having a notched portion at a corner thereof as shown in FIG. 1, for example, all the necessary attitudes of the part W can be discriminated by positioning a detection element or a signal transmission member at points $2b$ and $2c$ respectively when the arrival of the part W has been detected at a point $2a$ in FIG. 2. Namely, the attitude of the part corresponding to $W_1$ (FIG. $2a$) is in a detecting state at both the points $2b$ and $2c$, that of $W_2$ (FIG. $2b$) is in a non-detecting state at both $2b$ and $2c$, that of $W_3$ (FIG. $2c$) is in a non-detecting state at $2b$ and in a detecting state at $2c$, and that of $W_4$ (FIG. $2d$) is in a detecting state at $2b$ and in a non-detecting state at $2c$.

This method, however, is premised on the assumption that all the attitudes and shapes for transmitting the detecting portion are already known. Therefore, even if the attitudes and shapes of the part W are detected at $2a$, $2b$ and $2c$, when a part $W_5$ in the attitude shown in FIG. 3 gets mixed in with the other parts, the attitude of the part $W_5$ cannot be discriminated as the detecting state thereof is entirely the same as that of the part $W_2$ in FIG. $2b$. The work to search for the above-noted typical portion becomes more troublesome as the shape of the parts becomes more complicated. As illustrated, the conventional method lacks flexibility and takes much time, labor and cost for adjustment in case the shape of the parts is changed and, therefore, the conventional method is not suitable for a variety of differently shaped parts produced in small quantity.

SUMMARY OF THE INVENTION

Accordingly, it is an object of the present invention to provide a device for discriminating the attitude of parts based on shape information of the parts.

It is another object of the invention to provide a device for discriminating the attitude of parts without requiring adjustments in case the shape of the parts is changed by automatically discriminating the shape by comparing the detected attitude of the parts with a reference attitude stored in a memory.

BRIEF DESCRIPTION OF THE DRAWINGS

FIGS. $2a$–$2d$ and 3 are explanatory views showing the conventional attitude discriminating method.

DESCRIPTION OF THE PREFERRED EMBODIMENTS

Hereafter, an embodiment of the present invention will be described in conjunction with the drawings.

Figure 1:
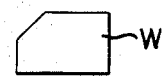
FIG. 1 is a plan view showing a part to be fed.
Figure 2A:
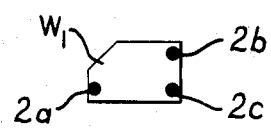
Figure 3:
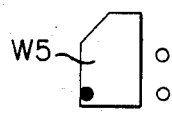
Figure 2B:
Figure 2C:
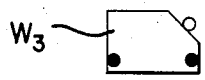
Figure 2D:
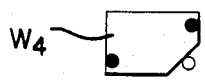
Figure 4:
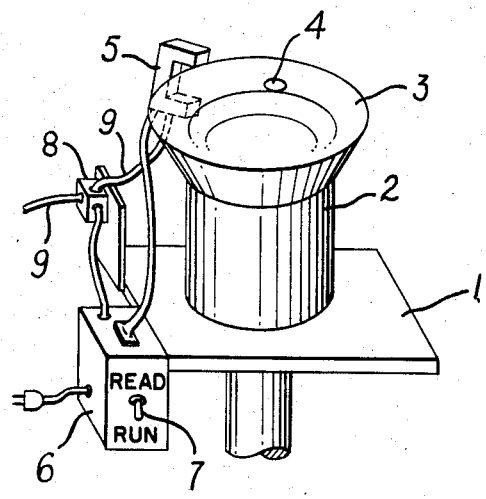
FIG. 4 is a perspective explanatory view showing an embodiment of the present invention.

FIG. 4 is an explanatory view of an embodiment of the present invention used as a selection/arraying device by attaching the present device to a vibratory parts feeder. Numeral 1 is a stand, 2 is a vibrating body for vibrating a bowl fixed on the stand 1, 3 is a bowl secured integrally to the vibrating body 2 for transmitting a part by vibration, 4 is a part being transmitted along a track of the bowl 3, 5 is an optical detector secured along the track of the bowl 3 for detecting an attitude of the part 4 and producing corresponding detection signals, 6 is a control box for processing the detection signals produced by the detector 5, 7 is a toggle switch for switching the processed content in the control box 6, 8 is an electromagnetic valve for controlling the feeding of the part 4 back to the bottom of the bowl 3 in response to a discriminating output from the control box 6, and 9 is a tube selectively controlled by the electromagnetic valve for feeding compressed air, one end of which is secured to the bowl 3. Namely, the detection signals representative of the attitude of the part 4 detected by passing through the detector 5 are processed in the control box 6, and when the electromagnetic valve 8 is actuated by the discriminating output signal, the part 4 is ejected back to the bottom of the bowl 3.

Figure 5:
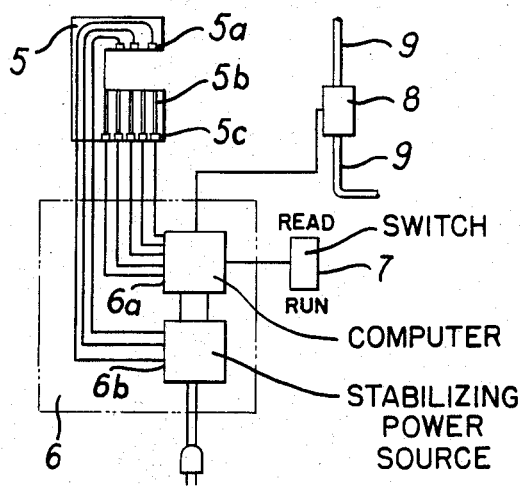
FIG. 5 is a block diagram showing an essential portion of the structure shown in FIG. 4, FIGS. 6($a$) and 6($b$) are block diagrams showing an operation in the computer in FIG. 5.

Subsequently, the construction of the present device will be illustrated in more detail with reference to FIGS. 5, 6 and 7.

The optical detector 5 comprises plural light emitting elements $5a$ at an upper portion and plural optical fibers $5b$ at a lower portion, and at the lower ends of the fibers $5b$ are incorporated plural light receiving elements of the same number as the fibers $5b$. The fibers $5b$ are positioned close to each other and arranged in a line on the track of the bowl as shown in FIG. 7, and the light emitting elements $5a$ are arranged in a line corresponding to the fibers $5b$. As the part 4 travels between the fibers $5b$ and the light emitting elements $5a$, successive areas of the part 4 block light from reaching certain ones of the light receiving elements $5c$ according to the shape or attitude of the part 4, and the light receiving elements $5c$ thus produce a pattern of detection signals (corresponding to the OFF-ON or blocked-unblocked states thereof) representative of the attitude of the part 4. The detection signals are processed in turn by a computer $6a$, such as a micro computer, housed in the control box 6. $6b$ is a stabilizing power source for driving the light emitting elements $5a$ and the computer $6a$.

Figure 6A:
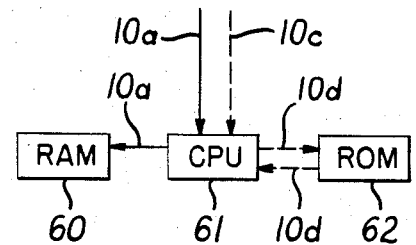

Next, the flow of signals in the computer $6a$ and the function of the toggle switch 7 will be illustrated in conjunction with FIG. 6.

Figure 6B:
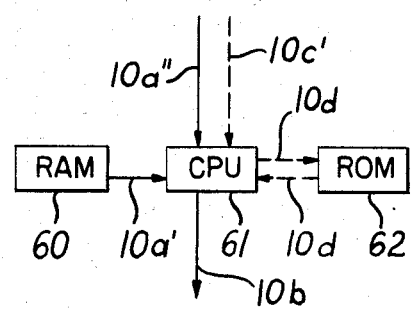
Figure 7:
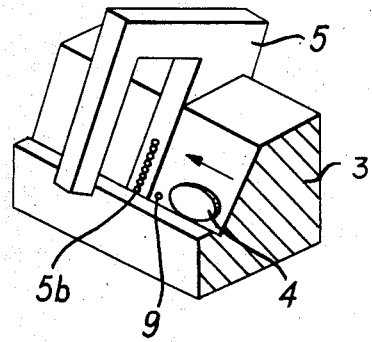
FIG. 7 is a perspective view showing a detector in accordance with an embodiment of the present invention.

When the toggle switch 7 is at READ position, i.e. at the READ mode $10c$, a reference signal pattern $10a$ produced by the detector 5 flows to a RAM 60 in the computer $6a$ through a CPU 61 to be memorized as shown in FIG. 6($a$). On the other hand, when the toggle switch 7 is at the RUN position, i.e. at a RUN mode $10c'$, a detection signal pattern $10a''$ is compared with the reference signal pattern $10a'$ memorized in the RAM 60 as shown in FIG. 6(b), and a discriminating output signal 10b is produced in response to an unfavorable comparison, i.e., when the detection signal pattern 10a" is different from the reference signal pattern 10a', thereby denoting that the attitude of the part 4 passing through the detector 5 is different from the desired attitude represented by the attitude data previously stored in the RAM 60. The discriminating output signal 10b activates the electromagnetic valve 8 to eject compressed air from the tube 9 to thereby drop the part 4 of undesired attitude into the bowl 3. 10c is a mode signal from the toggle switch 7, and 10d is a control signal to prosecute the above-noted series of processes in accordance with data stored in a ROM 62.

When the shape of a part is changed, the mode switch 7 is switched to the READ position, and the part 4 of changed shape is placed in a desired attitude on the parts feeding passage or track along the inside rim of the bowl 3. After the part 4 passes between the light emitting portion 5a and the light receiving portion 5b, 5c of the detector 5, the mode switch 7 is switched to the RUN position. The work accompanied by a change in the shape of the part position is thus finished as illustrated above. After that, all the parts in a desired attitude out of the parts 4 being successively fed along the track of the bowl 3 are permitted to pass and those parts not in the desired attitude are ejected by compressed air from the tube 9 and dropped back to the bottom of the bowl 3. With respect to the arrangement of the fibers 5b at the light receiving portion 5b, 5c, although the parts are judged as being in same attitude if the same shape signals are detected in both the READ and RUN modes in this device, the parts at READ and RUN are processed in the same track by the provision of the toggle switch 7, whereby the fibers 5b may be arranged irregularly. In order to detect any part shape, it is necessary that the fibers 5b be closely arranged in a zone which extends almost in the perpendicular direction to the parts feeding direction.

Because, if a part is of rectangular shape with several pinholes, the attitude of the part cannot be judged unless the pinholes are detected. When the fibers are widely spaced or distributed in the parts feeding direction, there is a high possibility that plural parts will be simultaneously detected, which causes a mis-discrimination. Namely, when plural parts are simultaneously detected, the attitude of the parts cannot be discriminated separately and consequently the parts are judged as a part of different shape by the computer. For the above-noted reasons a zonal and close arrangement of the fibers is most suitable.

In the present device, since the detection signals are inputted at extremely high speed, the fibers are sensitive to a minute change in the position of the light source. Assuming that a part with a pinhole is passing through the detecting portion, the pinhole can be detected if the fiber is located just under the pinhole. Actually, however, the pinhole is detected only when the light source is just above the fiber, and the pinhole may not be detected in the shadow region when the light source is slightly inclined. If the light source is inclined when the toggle switch 7 is in the READ position and RUN position, the attitude of the parts will be misdiscriminated. The inclination of the light source depends on the diameter of pinhole, sensitivity of the light receiving elements and the thickness of the parts. Further, the inclination of the light source largely affects the discrimination of the attitude of the parts of this device.

Accordingly, it is preferable that the light emitting portion and light receiving portion are made in one body to improve the reliability of this device.

In this embodiment, although a part to serve as a sample or reference passes through the detector 5 and the reference signal pattern 10a is memorized in the RAM 60 in the computer 6a, it is to be noted that the reference signal pattern can be fed to the RAM 6a via a key board.

Although the switching between the READ mode 10c and the RUN mode 10c' is operated manually by the toggle switch 7, it is easy to construct the device in a way that when an initial part just after the main power source is turned ON passes through the detector 5, the toggle switch 7 automatically changes from the READ mode to the RUN mode.

Further, it is to be noted that if a number of the light receiving elements of the detector are provided in a matrix, the shape of the parts can be memorized in the RAM only by mounting the parts on the detector without feeding.

As illustrated, the present invention provides a CPU for comparing a reference signal pattern memorized in the RAM with a detection signal pattern detected by the detector, whereby a device for discriminating the attitude of parts and capable of supplying parts of complicated and various shapes is provided. The reference signal pattern is fed to the RAM by feeding a standard part past the detector and by comparing the detection signal pattern from the detector with the reference signal pattern stored in the RAM using the switching means, such as the toggle switch, the detection signal pattern of a part of complicated shape can be easily inputted into the RAM.

Since the light receiving elements of the detector are arranged zonally in the perpendicular direction to the parts feeding direction, a device capable of discriminating the attitude of parts with high accuracy and without detection error is provided. Further, since the opposed light emitting elements and light receiving elements are integrally provided, adverse influence due to external light is reduced.

What is claimed is:

1. A device for discriminating the attitude of parts comprising: a detector composed of a plurality of light receiving elements disposed in a singular line or in plural lines extending in a direction perpendicular to a feeding direction of the parts, and at least one light emitting element spaced from and facing said light receiving elements; a RAM for memorizing a reference signal pattern for use as a standard obtained by successively detecting the shape of a part as it travels past said detector in a preselected desired attitude; and a CPU for comparing the reference signal pattern memorized in said RAM with the signal data pattern obtained when the parts to be discriminated travel successively past said detector in arbitrary attitudes and producing a discrimination output signal in response to each unfavorable comparison thereby denoting those parts which are not in the preselected attitude.

2. A device for discriminating the attitude of parts as claimed in 1; including switching means for switching between a first function of said CPU to enable detection signals obtained from said detector to be input to said RAM as the part travels past said detector in each desired attitude to thereby obtain said reference signal pattern, and a second function of said CPU to enable the reference signal pattern memorized in said RAM to be compared with the data patterns obtained with the parts travel successively past said detector in arbitrary attitudes.

3. A device for discriminating the attitude of parts as claimed in claim 2; wherein said light receiving elements and said light emitting element are fixed within a rigid body.

4. A device for discriminating the attitude of parts as claimed in claim 1; wherein said light receiving elements and said light emitting element are fixed within a rigid body.

5. A device for discriminating the attitude of similarly shaped parts fed successively in arbitrary attitudes along a path of travel in a given feeding direction, the device comprising: optical detecting means for optically detecting successive areas of each part as the parts are fed successively along a path of travel through a detection zone in a given feeding direction and producing for each part a corresponding detection signal pattern representative of the attitude of the part; memory means for storing reference data in the form of a reference signal pattern which corresponds to a preselected attitude of the parts; and comparing means for comparing the detection signal pattern produced for each part with the reference signal pattern stored in the memory means and producing a discrimination output signal in response to each unfavorable comparison thereby denoting those parts which are not in the preselected attitude.

6. A device according to claim 5; wherein the detection zone extends transversely of the given feeding direction of the parts to effect the optical detection of successive transverse areas of each part.

7. A device according to claim 6; wherein the optical detecting means comprises plurl light-receiving elements disposed in the detection zone on one side of the path of travel of the parts, and light-emitting means disposed in the detection zone on the other side of the path of travel for irradiating light toward the light-receiving elements so that as a part travels through the detection zone successive areas of the part block light from reaching certain ones of the light-receiving elements according to the attitude of the part whereby the light-receiving elements produce a detection signal pattern which represents the attitude of the part.

8. A device according to claim 7; wherein the light-receiving elements are disposed in one or more lines which extend transversely of the feeding direction of the parts.

9. A device according to claim 7; including means rigidly connecting together the light-receiving elements and the light-emitting means to prevent relative displacement therebetween.

10. A device according to claim 5; including reading means for reading the reference data into the memory means.

11. A device according to claim 5; comprising a central processing unit which includes said comparing means and operable in a read mode for reading the reference signal pattern into the memory means and operable in a run mode for comparing the detection signal pattern produced by the detecting means with the reference signal pattern stored in the memory means.

12. A device according to claim 11; including switching means for selectively switching the central processing unit between the read and run modes.

13. A device according to claim 11; wherein the memory means comprises a RAM.

14. A device according to claim 5; further including ejecting means responsive to the discrimination output signal for ejecting from the path of travel those parts which are not in the preselected attitude.

* * * * *